SYSTEM AND MEANS FOR DETERMINATION OF DISTANCE AND DIRECTION

Original Filed June 6, 1950 2 Sheets-Sheet 1

INVENTORS:
HELGE FABIAN ROST
PER HARRY ELIAS CLAESSON
BY Richardson, David and Nardon
ATTYS

SYSTEM AND MEANS FOR DETERMINATION OF DISTANCE AND DIRECTION

Original Filed June 6, 1950 2 Sheets-Sheet 2

INVENTORS:
HELGE FABIAN ROST
PER HARRY ELIAS CLAESSON
BY Richardson, David and Nordon
ATTY.

United States Patent Office

Re. 25,090
Reissued Nov. 21, 1961

25,090
SYSTEM AND MEANS FOR DETERMINATION OF DISTANCE AND DIRECTION

Helge Fabian Rost, deceased, late of Bylgiavagen 5, Djursholm, Sweden, by Svenska Handelsbanken, administrator, Stockholm, and Per Harry Elias Claesson, Danderyd, Sweden; said Svenska Handelsbanken assignor to Bjorn Gustav Alexander Rost, Anders Erik Rost, and Nils Helge Erland Rost, all of Vallingby, Stockholm, Sweden Original No. 2,648,062, dated Aug. 4, 1953, Ser. No. 137,074, Jan. 6, 1950. Application for reissue Aug. 22, 1960, Ser. No. 14,160. In Sweden Feb. 26, 1948
9 Claims. (Cl. 343—11)

Figure 1:
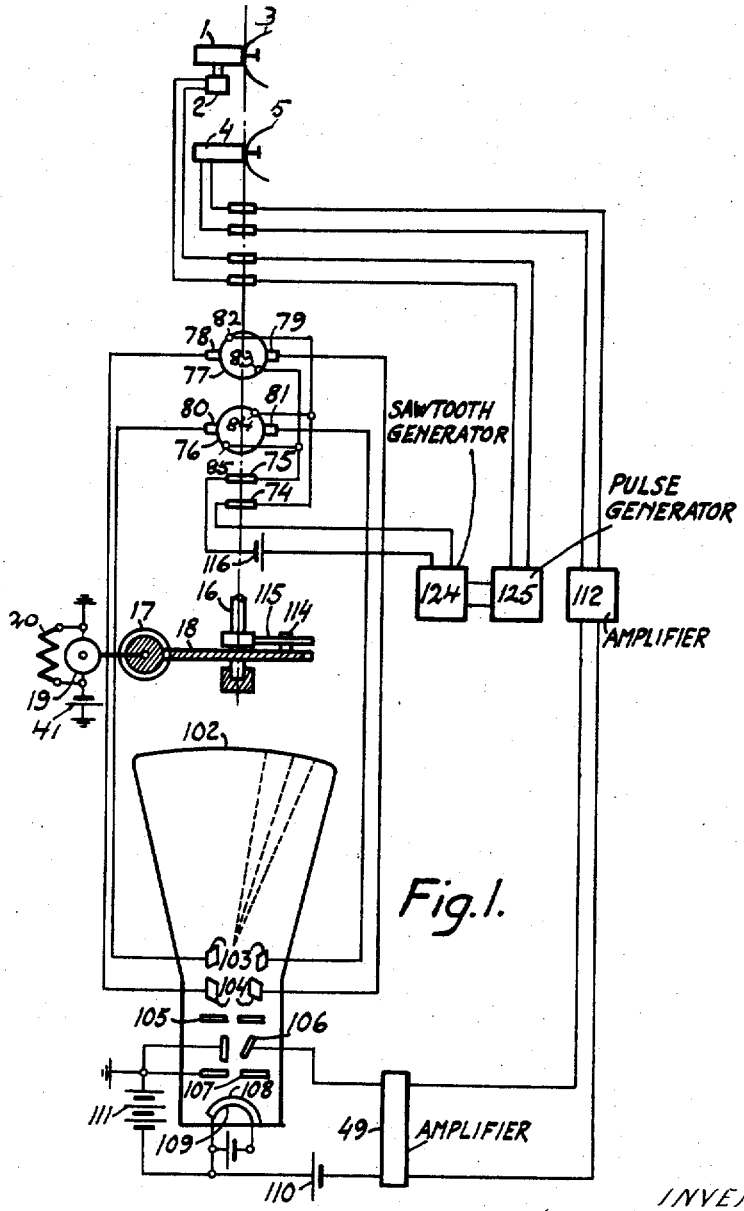

Matter enclosed in heavy brackets [ ] appears in the original patent but forms no part of this reissue specification; matter printed in italics indicates the additions made by reissue.

The present application is a continuation-in-part of our co-pending application Ser. No. 360,362, filed October 9, 1940, now Patent No. 2,536,770.

The said patent pertains to a radio object detecting system comprising a source of frequency modulated radio frequency energy, means for directing radioenergy in the form of a beam, means for causing said beam to scan a region proximate to said system in a cyclic manner, means for receiving the beam energy reflected by an object upon which it impinges, and for directly deriving energy from said radiating means and combining it with said reflected energy, means for frequency analysing the said combined energies, and means including a cathode ray tube connected to the scanning means and to the frequency analysing means, which are jointly controlled for producing a visual signal, which indicates simultaneously the direction and the distance of the reflecting object.

The present application refers to a system for the determination of directions and distances to objects in space, comprising in combination, means for transmitting and receiving pulse modulated radio waves, highly directional antenna means for the transmission of said waves in a certain direction and for the reception of reflected radio waves from about the same direction as the transmitted waves, a support, means for mounting said antenna means on said support, means for rotating said antenna means at a predetermined rate about said axis, pulse generating means coupled to the transmitting and receiving means and comprising a saw-tooth generator and a pulse generator, and means whereby said generators are adapted to be synchronized with each other, means of indication comprising a ray indicating screen and a ray emitting source for the emission of rays projectible as visible light spots on said screen, deviation means adapted to deviate such a ray radially, and control means coupled to the receiving means for the control of the intensity of the ray, and synchronizing means coupled to the movable parts of the antenna means and to said saw-tooth generator and to the said deviation means for rotating the ray synchronously with the directional antenna means and for deviating the ray in the same instant direction as that of the antenna means, whereby a pulse is transmittable simultaneously as the ray leaves its normal position in the direction of a reflecting object, and a light spot is produced on the screen at a distance from its normal position proportional to the distance to said reflecting object upon the receipt of a reflected wave.

According to this invention a particularly effective arrangement is obtained, whereby the transmitting means is modulated with a pulse generator and the indicating ray is modulated with a saw-tooth generator, which in known manner are synchronized with each other. In this manner the transmitter can be modulated with very short and heavy pulses, which, however, are not suitable for the modulation of the ray-deviating means in a cathode ray tube.

Figure 2:
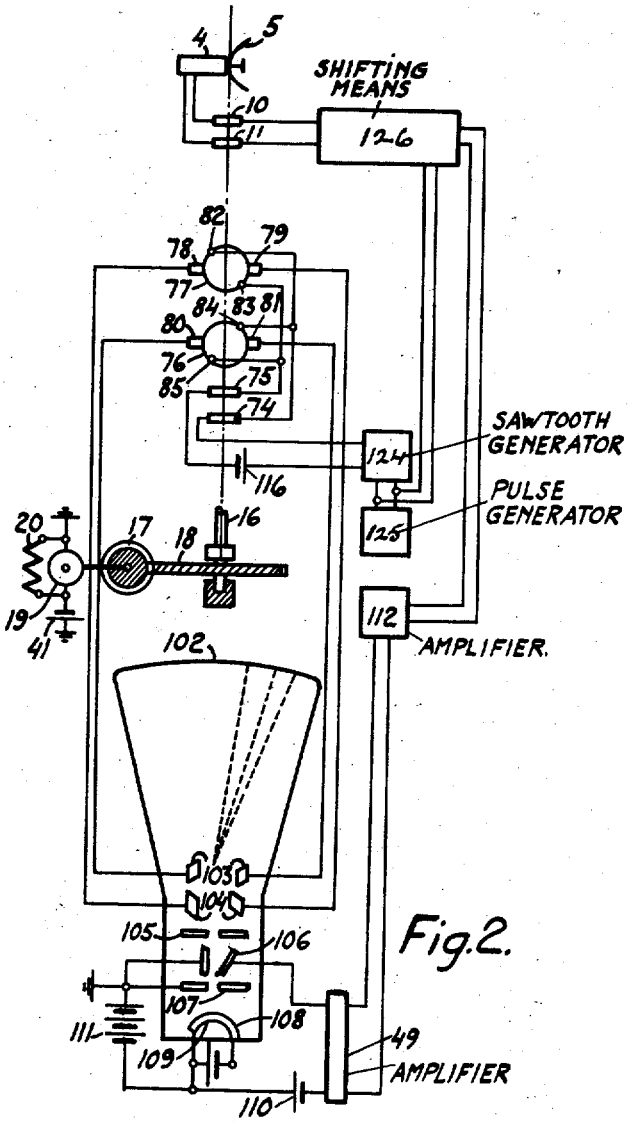

Our invention will be better understood from the following description, when read in connection with the accompanying drawings, in which:

FIG. 1 shows a modification of the diagram shown in FIG. 2 of said Patent Number 2,536,770, in which the wave analyser 112 and variable condenser 113 have been replaced by an amplifier 112, and alternator 24 driven by motor 19 has been replaced by a saw-tooth generator 124 and a pulse generator 125, which are synchronized and coupled to each other.

FIG. 2 is similar to FIG. 1 with the exception that the same radiant elements are used both for transmission and reception, shifting means 126 having been provided for shifting between transmission and reception.

In FIG. 1 a radio transmitter 1 provided with a sharply directed antenna means 3, preferably of ultra short wave type, and a modulator 2 are attached to a rotatable axis 16. A detector 4 provided with a sharply directed antenna means 5 is attached to the same rotatable axis 16 for receiving radio waves transmitted by the transmitter and reflected by an object in space.

Collector rings 74 and 75 are arranged on the axis 16 for conducting current to circular resistance wires or potentiometers 76 and 77 arranged on the axis 16 and provided with brushes 80—81 and 78—79 respectively. Conductors from the collector rings 74 and 75 are connected to the resistance wires 76 and 77 at diametrically opposite places, whereby a diameter through points 84—85 on wire 76 is located at right angles to a diameter through points 82—83 on wire 77.

The axis 16 is driven by a motor 19 and worm gear 17—18. A pin 114 is attached to the cogwheel 18. An arm 115 is provided with an opening or slot for moving the pin 114 back and forth, if cogwheel 18 is eccentrically located with respect to axis 16.

A cathode ray oscillograph is provided with two deflecting plates 104 coupled to brushes 78—79 of resistance wire 77.

Two other deflecting plates 103 at right angles to the first mentioned deflecting plates 104 are connected to brushes 80—81 of resistance wire 76. The resistance wires 76 and 77 are interconnected in a circuit for deflection of the cathode ray in such a manner, that the indicating ray on the fluorescent screen 102 will have exactly the same direction as the antenna means of the transmitter 1 and of the receiver 4, or as the common antenna means shown in FIG. 2 for both transmitting and receiving.

A cathode ray trap diaphragm 105 is provided in the path of the cathode ray and electrodes 106 for deviation of the ray, when no reflection radio energy is received, so that the ray is normally invisible on the screen 102. The cathode ray tube is further provided with an anode 107, a cathode 108, a filament 109 and a current source 110 for supplying negative potential to the electrodes to cause the ray to hit the diaphragm 105, instead of proceeding along the axis of the tube through a center hole in the diaphragm.

An anode current source 111 is connected to the anode 107. An amplifier 112 of known construction is connected between the receiver 4 and the cathode ray tube, and an extra amplifier 49 can be interconnected for further amplification of the reflected pulses. If desired, the amplifier 49 can also be adapted to act as a rectifier.

124—125 is a pulse emitting device comprising a pulse generator 125 connected to the modulator 2 of the transmitter 1, and a saw-tooth generator 124 coupled to the ray deviating means 103—104 over circular resistance wires 76—77.

The pulse generator and the saw-tooth generator are connected with each other and synchronized for emitting heavy modulating pulses to the transmitter and for deviating the cathode ray from its origin on the screen 102 at the moment the radio pulse is transmitted into space.

Instead of separate antennas and directing means 3 and 5 for the transmitter and the receiver a common antenna and directing means can be used both for transmission and reception as shown in FIG. 2.

By means of a cam (not shown) driven by the motor 19 shifting of the antenna and the directing means can be made in the shifting means 126 in known manner at desired intervals between the transmitter and the receiver.

If the transmitter and the receiver are located on board a movable craft, they can be combined with a known compensating device for keeping the axis 16 in a vertical position, for example by a gyro or other device.

The operation of the device shown in FIGS. 1 and 2 takes place in the following manner.

A pulse modulated wave transmitted from the transmitter 1 is received in the receiver by the detector 4 after after reflection from an object. The transmitter and the receiver can be given a rotating or a back and forth motion by means of the axis 16. After amplification of the wave in the amplifier 112 and, if desired, rectification in amplifier 49, a potential is delivered to electrodes 106 so that the cathode ray is shown on the screen 102. When a pulse is generated by the pulse emitting device 124—125, a heavy pulse is transmitted to the modulator 2 and a weak pulse to the deflecting plates 103—104 for simultaneously deflecting the cathode ray.

When an echo is received in the receiver 4, said echo is amplified, whereby it actuates the electrodes 106 of the cathode ray tube after such a time and after the cathode ray has been deflected to such a distance from its normal position on the screen, which corresponds to the echo-time.

The cathode ray is moved towards the periphery of the screen and will be visible only when an echo arrives.

If the movement of the axis 16 is made sufficiently rapidly, a light spot will be visible on the screen each time the radio wave passes the object, and if the fluorescent screen has been made with sufficient delaying action, a fixed light spot will indicate the position of a ship, an iceberg or the entire coastline will be visible as a map on the screen.

The motor 19 can either directly or by the aid of a saw-tooth generator synchronized by the motor make the cathode ray move radially back and forth between the center and the periphery of the screen of the cathode ray tube. When the motor has a certain angle, the cathode ray will thus be in the center. At this angle the motor will connect the transmitter for a short moment over a cam wheel.

In this case the same reflector can be used for both transmission and reception as shown in FIG. 2. The cam wheel of the motor will then switch between transmission and reception at the above mentioned angle.

It is, however, not necessary that the motor takes part in the transmission. The motor can merely attend to the rotation of the transmitter and of the receiver and synchronously therewith the rotation of the cathode ray.

If the saw-tooth generator moves the cathode ray between the center and the periphery of the screen, the current from a synchronously operating pulse generator can then direct the transmitting pulses.

The connection and disconnection of the transmitter can take place by means of a shifting device in the form of an electron tube relay inserted in the sending circuit, in order alternately to disconnect the transmitter and connect the receiver to the respective circuits. Said relays can consist of electron tubes or gas-filled tubes, which normally have high negative grid voltage and a high interior resistance, but during the switching period receives from the saw-tooth generator such a grid potential that the inner resistance is sufficiently lowered, and a pulse is emitted to the transmitter. When using such electron-tube relays, switching rates of any desired magnitude can be obtained in practice.

The axis 16, which carries the transmitter and the receiver can, of course, be made to rotate continuously or reciprocatingly so that only the desired region can be observed.

The direction of the desired object, for example, with respect to the track of a craft, can according to this invention be obtained by means of an indicating device combined with the rotating axis, which carries the receiver, or combined with an axis driven synchronously with said axis.

The fluorescent screen can be provided with a scale using polar coordinates, whereby the radius of the projection of the ray on the screen from the origin, indicates the distance to the object. By observing the angular position of the ray with respect to the polar coordinate scale, the angular position of an object with respect to the track of a craft can thus be observed.

We claim:

1. A system for the determination of directions and distances to objects in space comprising, in combination, means for transmitting and receiving pulse modulated radio waves, highly directional antenna means for the transmission of said waves in a certain direction and for the reception of reflected waves from about the same direction as the transmitted waves, a support, a rotatable shaft on said support, said antenna means being mounted on said shaft, means to rotate said shaft at a predetermined rate, pulse generating means coupled to the transmitting and receiving means and comprising a saw-tooth generator and a pulse generator, circuit means interconnecting said generators with each other for maintaining their outputs in predetermined fixed phase relationship, means of indication comprising a ray indicating screen and a ray emitting source for the emission of rays projectable as visible light spots on said screen, deviation means including deflecting means for moving said ray radially, and control means coupled to the receiving means for the control of the intensity of the ray, and synchronizing means coupled to the movable parts of the antenna means and to said saw-tooth generator and to the said deviation means for rotating the ray synchronously with the directional antenna means and for deviating the ray in fixed angular relationship with respect to the direction of the antenna means, whereby a pulse is transmitted simultaneously as the ray leaves its normal position in the direction of a reflecting object, and a light spot is produced on the screen at a distance from its normal position proportional to the distance to said reflecting object upon the receipt of a reflected wave.

2. The system as claimed in claim 1, in which the transmitting and receiving means are provided with common highly directional antenna means, shifting means connected to said transmitting and receiving means and to said antenna means and adapted at certain time intervals alternately to disconnect the transmitting means from and to connect the receiving means to the said common antenna means and vice versa.

3. A system for the determination of directions and distances to objects in space comprising, in combination, means for transmitting and receiving pulse modulated radio waves, highly directional antenna means for the transmission of said waves in a certain direction and for the reception of reflected waves from about the same direction as the transmitted waves, a support, a rotatable vertical shaft on said support, said antenna means being mounted on said shaft, means to rotate said shaft at a predetermined rate, pulse generating means coupled to said antenna means and comprising a saw-tooth generator and a pulse generator, and means whereby said generators are adapted to be synchronized with each other, means of indication comprising a ray indicating fluorescent screen with delaying action and a ray emitting source for the emission of rays projectable as visible light spots on said screen, deviation means adapted to deviate such a ray radially, and control means coupled to the receiving means for the control of the intensity of the ray, and synchronizing means coupled to the movable parts of the antenna means and to said saw-tooth generator and to the said deviation means for rotating the ray synchronously with the directional antenna means and for deviating the ray in the same instant direction as that of the antenna means, whereby a pulse is transmitted simultaneously as the ray leaves its normal position in the direction of a reflecting object, and a light spot is produced on the screen at a listance from its normal position proportional to the distance to said reflecting object upon the receipt of a reflected wave.

4. A direction and distance indicating device of the pulse modulation type, comprising: supporting means rotatable about a predetermined axis; means for rotating said supporting means; highly directional antenna means carried by said supporting means; transmitting means including pulse modulating means connected to said antenna means for causing the transmission of pulse modulated radio waves therefrom; receiving means connected to said antenna means for receiving transmitted waves reflected thereto; a cathode ray device comprising, a retentive fluorescent screen, means for producing a cathode ray *which when unblocked is* normally impinging on said screen at a predetermined point centrally located thereon, means for deflecting said ray along mutually perpendicular axes on said screen passing through said predetermined point, said deflection being independently controllable with respect to each axis, and means for controlling the intensity of said ray; orienting means connected to said deflecting means and comprising rotary means revolving in fixed angular relationship with respect to said supporting means for causing said ray to be deflected in a direction fixedly angularly related to the direction of said antenna means; a first generator for producing potentials of saw tooth wave shape connected to said deflecting means and to said orienting means for cyclically increasing the magnitude of said deflection in a linear manner at a predetermined rate; a second generator connected to said pulse modulating means and producing pulses of potential controlling said transmitting means; a first circuit means interconnecting said first and second generators and causing said second generator to produce a pulse at each instant when the output of said first generator causes said deflecting means to start movement of said ray radially outwardly from said predetermined point on said screen; and a second circuit means connecting said receiving means to said intensity control means for producing a luminous point on said screen upon receipt of a reflected wave, the angular position of said luminous point being determined by the direction of said antenna means and the radial distance thereof from said predetermined point being proportional to the total distance travelled by the transmitted and reflected waves.

5. A device according to claim 4, wherein said cathode ray device further comprises a centrally apertured diaphragm disposed intermediate said screen and said deflecting means for blocking said ray in the absence of any wave received by said receiving means.

6. A device according to claim 4, wherein said orienting means comprises: two spaced circular resistors carried by said supporting means concentrically with the axis of rotation thereof; diametrically opposed points of connection on each resistor, the diameter interconnecting said points on one resistor being perpendicular to the corresponding diameter on the other resistor; diametrically opposed substantially coplanar stationary contacts engaging each resistor; and further comprising circuit means for connecting said stationary contacts to said deflecting means of said cathode ray tube means; and further circuit means connecting said opposed points of connection on each resistor to said first generator.

*7. A system for the determination of directions and distances to objects in space comprising, in combination, means for transmitting and receiving pulse modulated radio waves, highly directional antenna means for the transmission of said waves in a certain direction and for the reception of reflected waves from about the same direction as the transmitted waves, a support, a rotatable vertical shaft on said support, said antenna means being mounted on said shaft for rotation through a full 360°, means to rotate said shaft at a predetermined rate, pulse generating means coupled to the transmitting and receiving means and comprising a saw-tooth generator and a pulse generator, circuit means interconnecting said generators with each other for maintaining their outputs in predetermined fixed phase relationship, means of indication comprising a ray indicating screen and a ray emitting source for the emission of rays projectable as visible light spots on said screen, deviation means consisting solely of a single deflecting means for moving said ray indication when visible on said screen, from a central position at the time of transmission of said transmitted waves radially outwardly toward the periphery of said screen during the time for reception of the reflected waves, and control means coupled to the receiving means for the control of the intensity of the ray, and synchronizing means coupled from the movable parts of the antenna means and from said saw-tooth generator to the said single deflecting means for rotating the ray synchronously with the directional antenna means and for deviating the ray in fixed angular relationship with respect to the direction of the antenna means, whereby a pulse is transmitted simultaneously as the ray leaves its normal central position on the screen in the direction of a reflecting object, and a light spot is produced on the screen at a distance from its normal central position proportional to the distance to said reflecting object upon the receipt of a reflected wave.*

*8. A system for the determination of directions and distances to objects in space comprising, in combination, means for transmitting and receiving pulse modulated radio waves, highly directional antenna means for the transmission of said waves in a certain direction and for the reception of reflected waves from about the same direction as the transmitted waves, a support, a rotatable shaft on said support, said antenna means being mounted on said shaft and rotatable through a full 360°, means to rotate said shaft at a predetermined rate, pulse generating means coupled to the transmitting and receiving means and comprising a saw-tooth generator and a pulse generator, circuit means interconnecting said generators with each other for maintaining their outputs in a predetermined fixed phase relationship, means of indication comprising a ray indicating screen and a ray emitting source for the emission of rays projectable as visible light spots on said screen, deviation means consisting solely of a single deflecting means for moving said ray indication when visible on said screen, from a central position at the time of transmission of said transmitted waves radially outwardly toward the periphery of said screen during the time of reception of reflected waves, and control means coupled to the receiving means for the control of the intensity of the ray, and synchronizing means coupled to the movable parts of the antenna means and to said saw-tooth generator to the said single deviation means for rotating the ray synchronously with the directional antenna means and for deviating the ray in fixed angular relationship with respect to the direction of the antenna means, whereby a pulse is transmitted*

*simultaneously as the ray leaves its normal central position on the screen in the direction of a reflecting object, and a light spot is produced on the screen at a distance from its normal central position proportional to the distance to said reflecting object upon the receipt of a reflected wave.*

*9. A system for the determination of directions and distances to objects in space comprising, in combination, means for transmitting and receiving pulse modulated radio waves, highly directional antenna means for the transmission of said waves in a certain direction and for the reception of reflected waves from about the same direction as the transmitted waves, a support, a rotatable vertical shaft on said support, said antenna means being mounted on said shaft for rotation through a full 360°, means to rotate said shaft at a predetermined rate, pulse generating means coupled to said antenna means and comprising a saw-tooth generator and a pulse generator, and means whereby said generators are adapted to be synchronized with each other, means of indication comprising a ray indicating fluorescent screen with delaying action and a ray emitting source for the emission of rays projectable as visible light spots on said screen, deviation means adapted to deviate such a ray radially from a central position toward the periphery of said fluorescent screen, and control means coupled to the receiving means*

*for the control of the intensity of the ray, and synchronizing means coupled to the movable parts of the antenna means and to said saw-tooth generator and to the said deviation means for rotating the ray synchronously with the directional antenna means and for deviating the ray in the same instant direction as that of the antenna means, whereby a pulse is transmitted simultaneously as the ray leaves its normal central position on said fluorescent screen in the direction of a reflecting object, and a light spot is produced on the screen at a distance from said normal position proportional to the distance to said reflecting object upon the receipt of a reflected wave.*

References Cited in the file of this patent or the original patent

UNITED STATES PATENTS

| | | |
|---|---|---|
| 2,130,913 | Tolson | Sept. 20, 1938 |
| 2,231,929 | Lyman | Feb. 18, 1941 |
| 2,421,028 | King | May 27, 1947 |
| 2,426,217 | Hoisington | Aug. 26, 1947 |
| 2,541,030 | Busignies | Feb. 13, 1951 |
| 2,807,016 | Gloess | Sept. 17, 1957 |

FOREIGN PATENTS

| | | |
|---|---|---|
| 108,556 | Australia | Sept. 28, 1939 |